Sept. 16, 1947.  J. JANDASEK  2,427,458
TURBINE TYPE FLUID TORQUE CONVERTER AND FLUID COUPLING
Filed Dec. 23, 1939  3 Sheets-Sheet 1
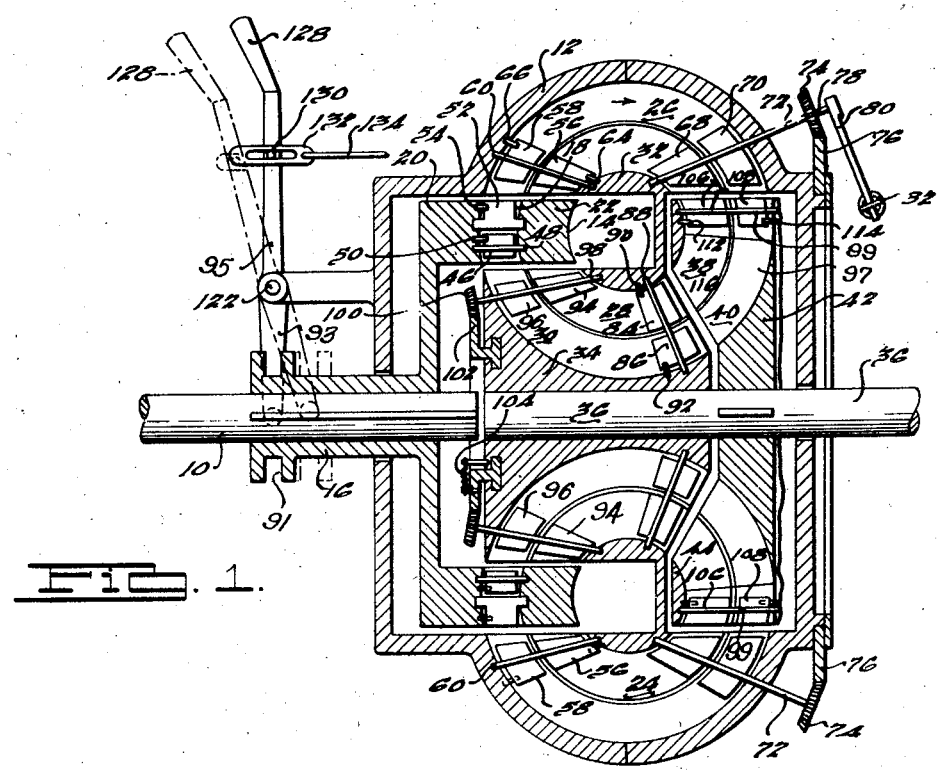
INVENTOR
Joseph Jandasek.
BY Dike, Calver + Gray.
ATTORNEYS INVENTOR
Joseph Jandasek.
BY Dike, Calver & Gray
ATTORNEYS.

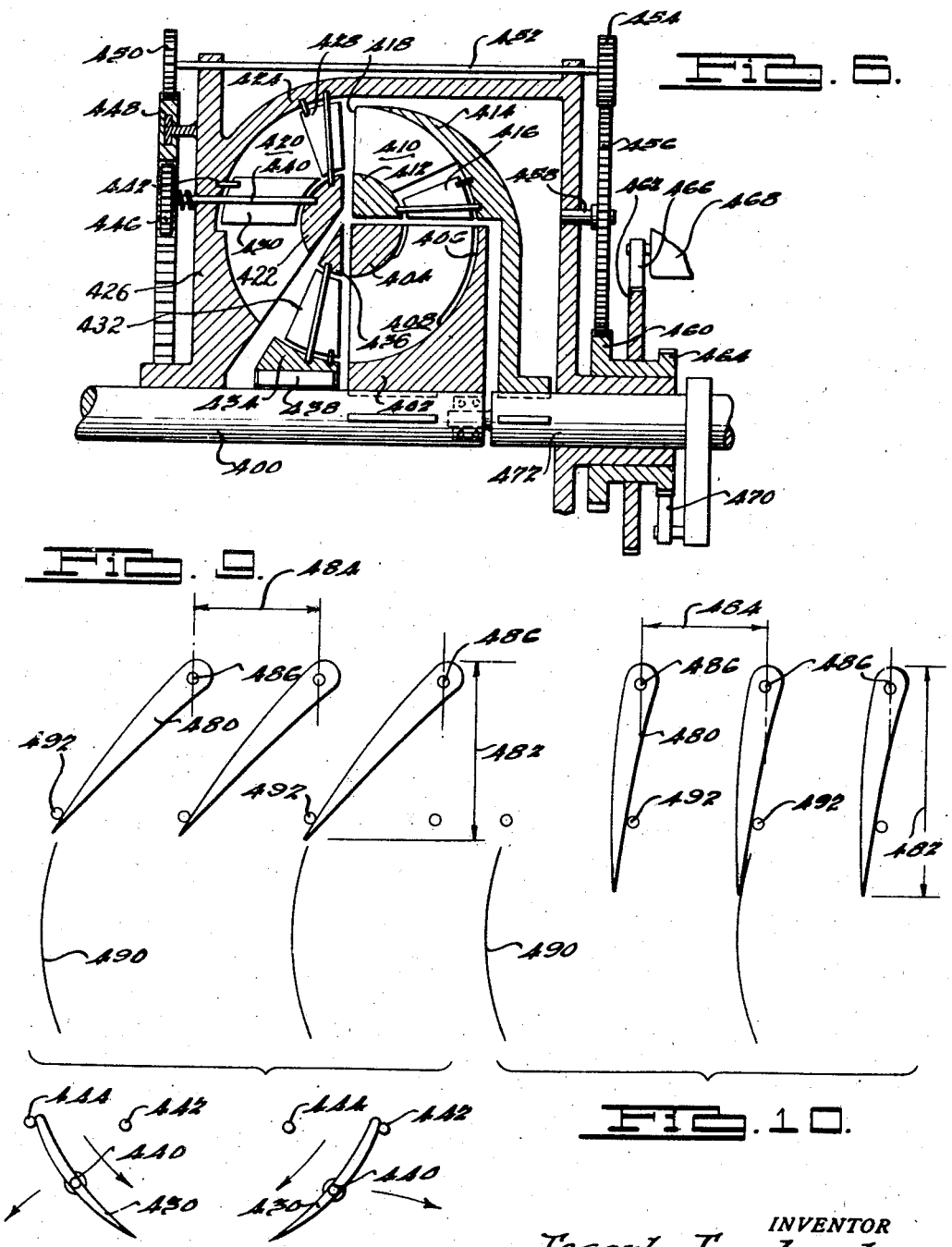

Patented Sept. 16, 1947

2,427,458

UNITED STATES PATENT OFFICE 2,427,458

TURBINE TYPE FLUID TORQUE CONVERTER AND FLUID COUPLING

Joseph Jandasek, Detroit, Mich., assignor to Bendix Aviation Corporation, South Bend, Ind., a corporation of Delaware Application December 23, 1939, Serial No. 310,785

3 Claims. (Cl. 60—54)

This invention relates to transmissions and more particularly to transmissions of the turbo torque converter type.

An object of this invention is to provide a turbo transmission having a reverse mechanism whereby the power of the engine may be employed as a braking force to stop the vehicle.

Another object of the invention is to provide a turbo transmission having a movable element which may be manually actuated to reverse the direction of power transmitted by the turbo unit to stop the vehicle.

A further object is to provide an improved turbo transmission having reverse mechanism which may be manually actuated to exert a braking force to stop the vehicle followed by an energization of the vehicle brakes.

Yet another object resides in the provision of a manually shiftable impeller or casing member to render the operation of the turbo unit more flexible and uniform.

A further object is to provide an improved turbo transmission having a rotatable housing wherein means extended into the housing are provided to vary the angular relation of the guide vanes.

A still further object is to provide means for converting a turbo transmission into a turbo clutch at high speed when light loads are being transmitted wherein the guide wheel is free to rotate, and into a torque converter when heavy loads are being transmitted wherein the guide wheel is locked against rotation.

Another object is to provide a turbo transmission having a multiple stage guide wheel provided with angularly movable gates which may be manually actuated to close or open the fluid circuit at spaced points intermediate a fluid energizing impeller and an energy absorbing turbine.

Yet a still further object of the invention is to provide means whereby the main gates of a guide wheel may be held stationary when the transmission is operated as a torque converter and may rotate with the driven shaft when the transmission is being operated as a turbo clutch, means being provided to vary the angular relation of the main gates dependent on the variable conditions of operation.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings:

Figure 1 is a longitudinal sectional view of a turbo transmission embodying one desirable form of the present invention wherein an axially shiftable impeller is employed;

Figure 2 is a part sectional view illustrating a modified form of the invention wherein an axially shiftable casing is employed to provide a reverse mechanism;

Figure 6 is a sectional view illustrating means for converting a turbo transmission from a torque converter into a turbo clutch;

Figures 7 and 8 are schematic views illustrating the main gates in two operative positions when the transmission is employed as a torque converter and as a turbo clutch; and Figures 9 and 10 are schematic views illustrating the relative positions of the semi-free vanes in relation to the main vanes in two operative positions.

Figure 3:
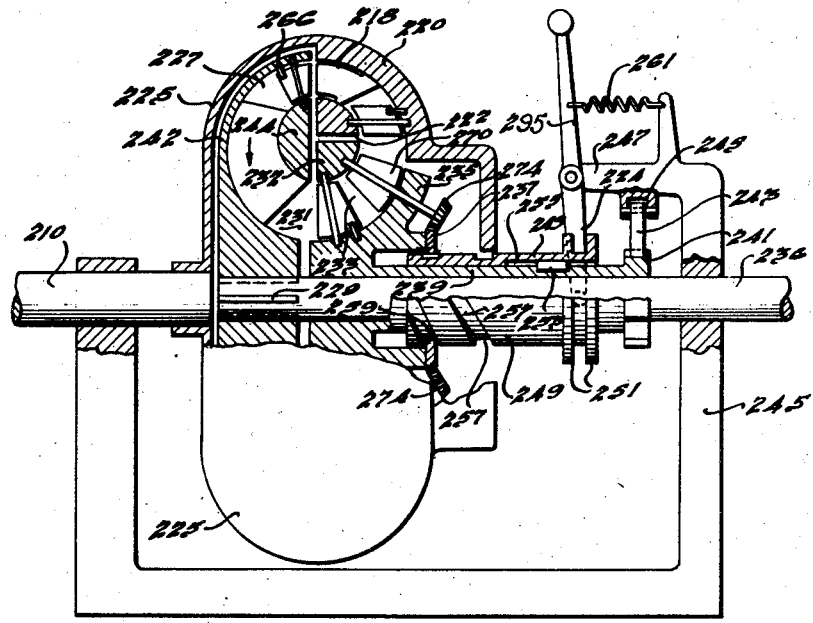
Figure 3 is a part sectional view illustrating a turbo transmission having a rotatable housing.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to Figure 1, it will be observed that a driving shaft 10 is extended into a housing 12. The shaft 10 may be driven by any suitable source of power, such for example as the engine of a vehicle. An impeller 14 in the housing 12 has a collar 16 supporting the impeller on the driving shaft 10 for rotation therewith and for relative axial movement. The impeller is adapted to energize a circulating fluid within the housing 12.

The energy transmitting circuit of this transmission comprises a channel 18 in the impeller 14 intermediate a web 20 and a shroud 22 for energizing the circulating fluid. A guide wheel has first and second stages within the housing 12. The guide wheel has inner and outer channels 24 and 26 constituting the first stage, and inner and outer channels 28 and 30 constituting the second stage. The first stage is adapted to receive the circulating fluid from the impeller, and the second stage is adapted to transmit fluid to the impeller.

The first stage guide wheel channels 24 and 26 are disposed between a shroud 32 and the casing 12. The second stage guide wheel channels 28 and 30 are disposed between the shroud 32 and a web 34 rotatably mounted on a driven shaft 36.

A turbine having inner and outer channels 38 and 40 is interposed between the first and second stages of the guide wheel and is fixed to the driven shaft 36 by a web 42. The turbine channels 38 and 40 are interposed between a shroud 44 and the web 42.

The impeller 14 is provided with semi-free vanes 46 rotatably mounted on shafts 48. The angular movement of the semi-free vanes 46 is limited by spaced stops 50 on opposite sides of the vanes 46. These semi-free vanes operate in a manner generally similar to that disclosed in Figure 1 of my co-pending application Serial No. 475,278, now Patent No. 2,186,025, granted January 9, 1940. A plurality of spaced main impeller blades 52 are positioned in the impeller channel 18 and are movable angularly under the influence of the force of the fluid passing over them, and the angular movement of these blades is limited by spaced stop members 54 on opposite sides of the blades.

A plurality of spaced semi-free vanes 56 and 58 are in the inner and outer channels 24 and 26 of the first stage of the guide wheel. The semi-free vanes 56 and 58 are mounted on shafts 60 carried by the housing 12 and the member 32. The semi-free vanes 56 and 58 are free to move angularly between the limits defined by spaced stop 64 and 66 respectively on opposite sides of the semi-free vanes.

Main gates or vanes 68 and 70 are fixed to shafts 72 in the inner and outer channels 24 and 26 of the first stage of the guide wheel. The shafts 72 are journaled in the shroud 32 and the housing 12 and extend beyond the housing, and pinions 74 on the shafts mesh with a ring gear 76 carried by the housing 12. One of the shafts 72 has an extended portion 78, and a lever 80 fixed to the extended portion is connected to a spring 82 for yieldingly urging the main gates 68 and 70 in one direction.

The second stage of the guide wheel is provided with a plurality of spaced semi-free vanes 84 and 86 in the inner and outer channels 28 and 30 respectively. These semi-free vanes are mounted on shafts 88 journaled in the shroud 32 and the web 34, and stops 90 and 92 are provided to limit the angular movement of the semi-free vanes 84 and 86.

A plurality of spaced main gates or vanes 94 and 96 in the inner and outer channels 28 and 30 respectively of the second stage of the guide wheel deflect the circulating fluid in a desired manner before entering the impeller channel 18. The main gates 94 and 96 are fixed to spaced shafts 98 pivotally mounted in the shroud 32 and the web 34 and extend beyond the web. Each of the shafts 98 has thereon a pinion 100 which meshes with a ring gear 102, and a spring 104 connecting the ring gear 102 and the shroud 34 yieldingly urges the main gates 94 and 96 towards one extreme position.

A plurality of spaced semi-free vanes 106 and 108 in the channels 38 and 40 are pivotally mounted on shafts 99 supported in the shroud 44 and the web 42. Angular movement of these semi-free vanes 106 and 108 is limited by spaced stops 112 and 114, and positioned adjacent the discharge side of the semi-free vanes 106 and 108 is a plurality of spaced main turbine vanes 116 and 97.

The gates and vanes carried by the impeller, guide wheel and turbine members operate in a substantially similar manner to the corresponding elements disclosed in my said Patent No. 2,186,025.

Means are provided to shift the impeller 14 relative to the housing 12 in order to align the impeller channel 18 with the outer guide wheel channels 26 and 30 so as to transmit power from the driving shaft 10 to the driven shaft 36 in the same direction, or to shift the impeller channel 18 into alignment with the inner guide wheel channels 24 and 28 to transmit power from the driving shaft 10 to the driven shaft 36 in the reverse direction.

One desirable form of impeller shifting means comprises a lever 95 pivotally mounted at 122 to a bracket on the housing 12 and provided with an extension 93 which may be received within an actuating collar 91 carried by the collar 16 to shift the impeller. The lever 95 may be provided with a manually actuated pedal 128. Motion transmitting means 130 carried by the lever 95 may be provided to selectively engage a slotted member 132 operably connected by means of a rod 134 to the brakes of a vehicle.

In the operation of this device when it is desired to stop the vehicle the lever 95 may be actuated to shift the impeller channel 18 into alignment with the inner guide wheel channels 24 and 28 to transmit power to the driven shaft 36 in the reverse direction. When the lever 95 approaches the limit of movement permitted by the slotted member 132 the motion transmitting means 130 engages the member 132 to transmit movement to the brake lever 134 to apply the vehicle brakes. It will be observed that by the use of this mechanism the inertia energy of the vehicle may be dissipated by reversing the turbo transmission unit. If an unusually quick stop is desired the engine may be accelerated to transmit power through the turbo transmission unit to stop the vehicle. In this manner it is unnecessary to apply the brakes to any considerable extent.

Figure 2 illustrates an embodiment of the invention similar in many respects to that illustrated in Figure 1. Corresponding parts have therefore been given corresponding numerals with the addition of 100. In this embodiment of the invention it will be observed that a housing 111 is axially shiftable relative to the driving shaft 110 and the driven shaft 136 to place either the inner or outer circuits 124 or 126 of the first stage of the guide wheel into communication with one of the circuits 138 or 140 of the turbine. The inner and outer circuits 138 and 140 of the turbine communicate with a single turbine passage 113 which communicates with a single passage 115 of the second stage of the guide wheel. The passageway 115 of the second stage of the guide wheel communicates with the single passageway 118 of an impeller 117 carried by an impeller web member 119 fixed to the driving shaft 110 in any suitable manner as by means of a key 121.

In operation, when the housing 111 is in the position illustrated, fluid circulates through the impeller passage 118, the inner first stage guide wheel channel 124, the inner turbine channel 138, the single turbine channel 113 and the single second stage guide wheel channel 115 to transmit power from the driving shaft 110 to the driven shaft 136 to drive the driven shaft in the same direction in which the driving shaft 110 rotates. When the lever 195 is moved to the dotted line position, the housing 111 is shifted so that the outer first stage guide wheel channel 126 communicates with the impeller channel 118 and with the outer turbine channel 140 to transmit power from the driving shaft 110 to the driven shaft 136 in reverse direction. It will be observed that a core member 123 serves to obstruct either the inner or outer channel 124 or 126 of the first stage guide wheel.

Substantially the same type of vanes, blades and gates are employed in connection with the impeller, first and second stage guide wheel and turbine as discussed in connection with Figure 1.

Figure 3 illustrates another embodiment of the invention similar in certain respects to the embodiment illustrated in Figure 1. Corresponding parts have therefore been identified with corresponding reference numerals with the addition of 200. In this embodiment it will be observed that a rotatable housing 225 is fixed to the driving shaft 210 for rotation therewith. The casing 225 has therein an impeller channel 218 interposed between a shroud 222 and an impeller web 220. Fluid is discharged from the impeller channel 218 in the direction indicated by the arrow and passes to a turbine passage 227 between a shroud 244 and a web 242. The web 242 may be fixed to a driven shaft 236 in any suitable manner, as by a key 229.

Interposed between the exit from the turbine channel 231 and the entrance to the impeller channel 218 is a guide wheel channel 233 between the shroud 232 and a web 235. The web 235 may be mounted on the driven shaft 236 so as to be freely rotatable thereon.

The impeller, turbine and guide wheels are provided with semi-free vanes, blades and gates similar in many respects to the corresponding parts described in connection with Figure 1. It will be observed that the pinions 274 mesh with a ring gear 237 supported on the web of the guide wheel 235 and are free to move angularly relative thereto through a predetermined range of travel. The web 235 has a sleeve 239 fitted on the driven shaft 236 and the sleeve has a ratchet 241 at its outer end. A pawl 243 cooperates with the ratchet 241 to provide for rotation of the sleeve 239 and the guide wheel in one direction only. The pawl 243 is mounted on a frame member 245 having an extension 247 supporting a manually operable lever 295.

A sleeve 249 has spaced flanges 251 for the reception of the fork 224 of a hand lever 295. The lever may be actuated to shift the sleeve 249 on the sleeve 239 and a key 253 on the sleeve 239 is received by a groove 255 in sleeve 249 to inhibit rotation of the sleeve 249. The sleeve 249 is provided with a helical groove 257. A projection 259 carried by the ring gear 237 is received by the helical groove 257 of the sleeve 249 to move the ring gear 237 angularly relatively to the guide wheel 235 to rotate the pinions 274 to vary the angle of the gates 270.

It will be observed that the gates 270 are yieldingly urged in one direction by means of a spring 261 in such a manner that the gates are free to move angularly under the influence of the pressure exerted by the circulating fluid. When it is desired to manually vary the angular relation of the gates, the lever 295 may be moved to slide the sleeve 249 relative to the sleeve 239 whereupon the projection 259 received by the helical groove 257 of the member 249 rotates the ring gear 237 relative to the guide wheel 235 so as to rotate the pinions 274 thereby varying the angular relation of the gates 270.

If desired the device illustrated in Figure 3 may be operated as a turbo clutch. To so operate the device, the one-way brake mechanism 243 should be omitted. The key 253 between the sleeve 239 and the sleeve 249 inhibits relative rotation but allows the sleeve 249 to move axially. This axial movement of the sleeve 249 then moves the ring gear 237 to actuate the pinions 274 to move the main gates 270 angularly to close or open the fluid circuit. When this device is being operated as a turbo clutch, the gates 270 are employed for the purpose of opening or closing the fluid circuit and not to change or vary the torque ratio developed by the device. This result is accomplished by reason of the fact that the sleeve 249 may be actuated manually by the lever 295.

It will of course be understood that the gates 270 may be carired by the driven shaft 236 and be freely rotatable thereon. These gates may if desired be carried by either the impeller or turbine units.

Figure 4:
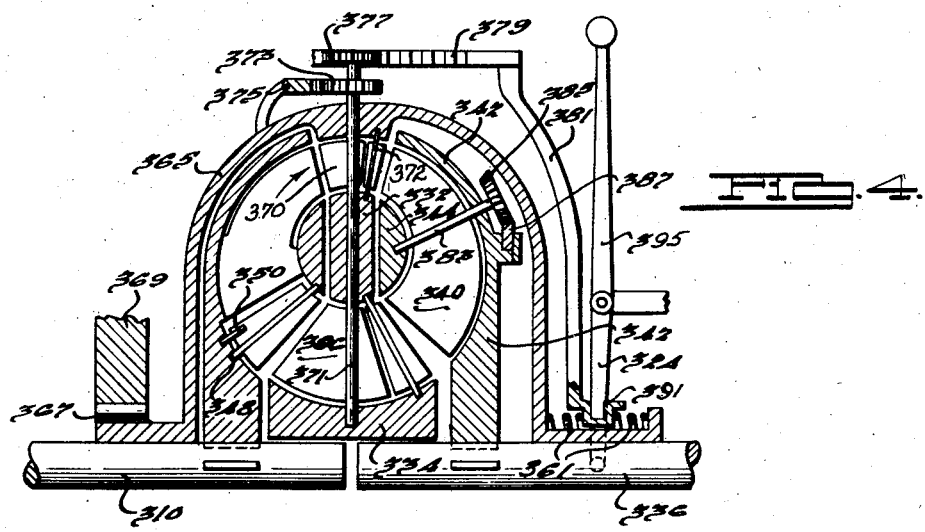
Figure 4 is a sectional view illustrating a turbo transmission having a multiple stage guide wheel.

Figure 4 shows an embodiment of the invention which is similar in certain respects to that of Figure 1. Corresponding parts have therefore been given corresponding numerals with the addition of 300. In this embodiment it will be observed that a housing 365 is rotatably mounted on the driving and driven shafts 310 and 336. A one-way brake 367 is interposed between the housing 365 and a fixed frame member 369 so that the housing 365 may rotate when the transmission is operating as a turbo clutch and is held stationary by the one-way brake 367 when the transmission is operating as a torque converter.

It will be observed that a multi-stage guide wheel having vanes 370 and 396 fixed to a shaft 371 pivotally mounted in the guide wheel web 334, the guide wheel shroud 332 and housing 365, is employed to close the fluid circuit at spaced points intermediate the impeller and turbine to positively prevent operation of the device under certain operating conditions. The shafts 371 are provided with pinions 373 meshing with a ring gear 375 to position all of the vanes 370 and 396 in the same angular relation. One of the shafts 371 is extended in length and carries a pinion 377 meshing with a rack 379 which may be actuated by an arm 381 slidably mounted on a portion of the housing 365.

Attention is called to the fact that in this embodiment of the invention the turbine blades 340 are fixed to shafts 383 pivotally mounted in the turbine shroud member 344 and extending through the turbine web member 342. The shafts 383 are provided with pinions 385 meshing with a ring gear 387. The ring gear 387 is free to move a small distance angularly relative to the turbine web 342. Any suitable yielding means engaging the ring gear 387 may be provided to yieldingly urge the turbine blades 340 toward one operative position.

Figure 5:
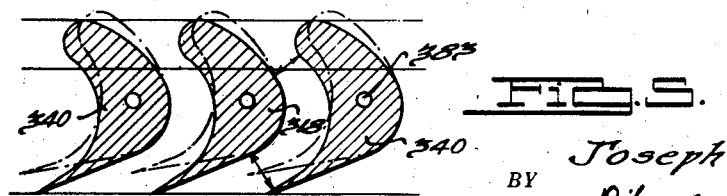
Figure 5 is a sectional view illustrating one desirable form of antireaction turbine vane.

Referring now to Figure 5, it will be observed that the turbine blades 340 mounted on the shafts 383 are shaped to provide a diverging channel when the vanes are positioned as illustrated in full lines as when the transmission is operating at heavy loads or at low speeds. When the transmission is operating at light load the yielding means associated with the ring gear 387 moves the vanes 340 angularly to the dotted line position whereupon a converging passageway is provided to decrease pressure whereupon the fluid will be discharged at higher velocity.

Referring now to Figure 6, it will be observed that a driving shaft 400 has thereon an impeller web 402 which cooperates with an impeller shroud 404 to provide an impeller channel having therein main flexible blades 408. Energy is imparted to a circulating fluid in the impeller channel 406 and transmitted to a turbine channel 410 interposed between a turbine shroud 412 and a turbine web 414. Semi-free vanes 416 and main blades 418 are positioned in the turbine channel 410. A guide wheel channel 420 interposed between a guide wheel shroud 422 and a guide wheel web 424 formed by a housing 426 is provided with semi-free vanes 428 and main gates 430. An auxiliary turbine 432 interposed between an auxiliary turbine web 434 and shroud 436 is provided to absorb energy from the circulating fluid and transmit it through a one-way clutch 438 to the driving shaft 400. The gates, blades and vanes are provided with stops as discussed in connection with the embodiment illustrated in Figure 1 to limit their angular movement between predetermined limits.

The main gates 430 in the guide wheel channel are mounted on shafts 440 and are movable between spaced stops 442 and 444 as more clearly illustrated in Figures 7 and 8. The shafts 440 are provided with pinions 446 in mesh with a double ring gear 448 which also meshes with gears 450. Each of the gears 450 is carried on a shaft 452 which extends axially of the driving and driven shafts, and a pinion 454 on each shaft 452 meshes with a gear 456 supported by a stub shaft 458 on the housing 426. The gears 456 mesh with a pinion 460 having spaced ratchet gears 462 and 464.

A pawl 466 carried by a stationary member 468 cooperates with the ratchet gear 462 to hold the housing 426 from rotation whereupon the gates 430 engage the stop members 444 as illustrated in Figure 7, and the fluid reaction flexes the gates 430 in the manner illustrated in Figure 7 when the transmission is operating as a torque converter.

When the transmission is operating as a turbo clutch, the fluid exerts a force on the gates 430 urging the guide wheel 420 and the housing 426 to rotate in the same direction as the driven shaft 472. A pawl 470 carried by the driven shaft 472 cooperates with the ratchet gear 464 to transmit this force to the driven shaft 472. During this phase of operation when the transmission is operating as a turbo clutch the gates 430 engage the stops 442 as illustrated in Figure 8 and the force transmitted by the circulating fluid bends them in the direction illustrated in Figure 8.

Figures 9 and 10 illustrate one desirable form of semi-free vanes 480 wherein the theoretical height of the vanes 482 is more than the pitch 484 of the vanes defined as the distance between the shafts 486 to rectify the fluid flow before it is transmitted to the main vanes 490. The semi-free vanes 480 are free to move between the limits defined by spaced stop members 492.

It is to be understood that the various features disclosed in the different figures of this application may be combined with similar features of other figures without departing from the spirit of the invention.

This is a continuation-in-part of my co-pending application Serial No. 475,278, filed August 14, 1930, now Patent No. 2,186,025, and application Serial No. 7,896, filed February 23, 1935, now Patent No. 2,205,794.

I claim:
1. In a turbo transmission having a fluid circuit, a driving shaft, an impeller fixed to the driving shaft, a driven shaft, a turbine fixed to the driven shaft, a two-stage guide wheel interposed between the impeller and turbine at two spaced points, a plurality of spaced angularly movable gates positioned in each of the guide wheel stages, means including shafts associated with the gates to vary the angular relation of the gates, and manual means operably connected to said shafts to actuate the gates to close the fluid circuit to isolate the impeller from the turbine at two spaced points thereby rendering the turbo transmission inoperative.

2. In a turbo unit, a driving shaft, an impeller carried by the driving shaft, a driven shaft, a turbine carried by the driven shaft, a casing surrounding the impeller and turbine, a stationary member associated with the casing, a guide wheel carried by the casing having a plurality of stages interposed between the impeller and turbine, a plurality of angularly movable gates in each stage of the guide wheel, manually operable means to move the gates of each stage to close the guide wheel at a plurality of spaced points to render the transmission inoperative, and one-way braking means between the casing and stationary member to hold the guide wheel against rotation to operate the turbo unit as a torque converter in one direction and to release the guide wheel to operate the unit as a turbo clutch in the opposite direction.

3. A turbo transmission comprising driving and driven shafts, an impeller and a turbine connected to the driving and driven shafts, a two-stage guide wheel cooperating with the impeller and the turbine to provide a power transmitting fluid circuit, said guide wheel having oppositely arranged sections interposed respectively between the impeller and the turbine, a set of fluid deflecting vanes at the entrance and at the outlet of each section of the guide wheel, said fluid deflecting vanes being controlled by fluid reaction in the power transmitting fluid circuit, means yieldingly restraining movement of one set of the vanes on each section, and means operative at will to rotatably adjust one set of vanes on each section.

JOSEPH JANDASEK.

REFERENCES CITED

The following references are of record in the file of this patent:

UNITED STATES PATENTS

| Number | Name | Date |
|---|---|---|
| 975,795 | Radcliffe | Nov. 15, 1910 |
| 1,121,397 | Radcliffe | Dec. 15, 1914 |
| 1,122,302 | Radcliffe | Dec. 29, 1914 |
| 1,122,303 | Radcliffe | Dec. 29, 1914 |
| 1,199,360 | Föttinger | Sept. 26, 1916 |
| 1,199,361 | Föttinger | Sept. 26, 1916 |
| 1,298,990 | Mason | Apr. 1, 1919 |
| 1,667,565 | Radcliffe | Apr. 24, 1928 |
| 1,672,232 | Saives | June 5, 1928 |
| 1,688,968 | Huwiler | Oct. 23, 1928 |
| 1,696,307 | James | Dec. 25, 1928 |
| 1,760,397 | Coats | May 27, 1930 |
| 1,760,480 | Coats | May 27, 1930 |

(Other references on following page)

UNITED STATES PATENTS

| Number | Name | Date |
|---|---|---|
| 1,766,520 | Klimek | June 24, 1930 |
| 1,855,967 | Jandasek | Apr. 26, 1932 |
| 1,859,448 | Klimek | May 24, 1932 |
| 1,972,462 | Schafer | Sept. 4, 1934 |
| 2,021,526 | Stock | Nov. 19, 1935 |
| 2,096,070 | Sinclair | Oct. 19, 1937 |
| 2,117,673 | Lysholm | May 17, 1938 |
| 2,162,543 | Banner | June 13, 1939 |
| 2,168,862 | de Lavaud | Aug. 8, 1939 |
| 2,186,025 | Jandasek | Jan. 9, 1940 |
| 2,190,830 | Dodge | Feb. 20, 1940 |
| 2,358,473 | Patterson | Sept. 19, 1944 |

FOREIGN PATENTS

| Number | Country | Date |
|---|---|---|
| 232,548 | Great Britain | 1925 |
| 280,889 | Great Britain | 1929 |
| 332,927 | Germany | 1921 |
| 441,549 | Germany | 1927 |
| 458,358 | Germany | 1928 |
| 69,204 | Sweden | 1930 |